US010125705B2

(12) United States Patent
Dickson et al.

(10) Patent No.: US 10,125,705 B2
(45) Date of Patent: Nov. 13, 2018

(54) CYLINDER DEACTIVATION ENTRANCE AND EXIT CONTROL

(71) Applicant: Cummins Inc., Columbus, IN (US)

(72) Inventors: Jonathan A. Dickson, Columbus, IN (US); Raymond C. Shute, Columbus, IN (US); Matthew D. Flessner, Westport, IN (US)

(73) Assignee: Cummins Inc., Columbus, IN (US)

( * ) Notice: Subject to any disclaimer, the term of this patent is extended or adjusted under 35 U.S.C. 154(b) by 91 days.

(21) Appl. No.: 15/286,856

(22) Filed: Oct. 6, 2016

(65) Prior Publication Data
US 2018/0100459 A1 Apr. 12, 2018

(51) Int. Cl.
F02D 41/00 (2006.01)
F02D 13/06 (2006.01)
F02B 75/18 (2006.01)
F02D 41/26 (2006.01)
F02D 17/04 (2006.01)
F02D 41/04 (2006.01)
F02D 41/38 (2006.01)

(52) U.S. Cl.
CPC .......... F02D 41/0087 (2013.01); F02B 75/18 (2013.01); F02D 13/06 (2013.01); F02D 17/04 (2013.01); F02D 41/0007 (2013.01); F02D 41/045 (2013.01); F02D 41/26 (2013.01); F02D 41/38 (2013.01); F02D 2041/389 (2013.01); F02D 2200/501 (2013.01); F02D 2200/701 (2013.01); F02D 2200/702 (2013.01)

(58) Field of Classification Search
CPC ...... F02D 13/06; F02D 17/04; F02D 41/0007; F02D 41/0087; F02D 41/045; F02D 2200/501
See application file for complete search history.

(56) References Cited

U.S. PATENT DOCUMENTS

| 5,813,383 | A | 9/1998 | Cummings |
| 7,331,332 | B2 | 2/2008 | Baumann et al. |
| 7,581,531 | B2 | 9/2009 | Schulz |
| 7,805,927 | B2 | 10/2010 | Brown et al. |
| 7,836,866 | B2 | 11/2010 | Luken et al. |
| 8,606,483 | B2 | 12/2013 | Krupadanam et al. |
| 2011/0053735 | A1* | 3/2011 | Lewis ................ F02N 5/04 477/99 |
| 2011/0265771 | A1 | 11/2011 | Banker et al. |
| 2015/0051816 | A1* | 2/2015 | Glugla ............. F02D 41/0055 701/108 |
| 2015/0191168 | A1* | 7/2015 | Mitsuyasu .......... B60W 20/00 701/54 |
| 2015/0252743 | A1* | 9/2015 | Glugla ............... F02D 17/02 701/104 |
| 2015/0258973 | A1 | 9/2015 | Hawkins et al. |
| 2015/0369180 | A1* | 12/2015 | Leone ............... F02N 11/0803 123/52.1 |
| 2017/0356366 | A1* | 12/2017 | Glugla ............. F02D 41/0087 |
| 2017/0356367 | A1* | 12/2017 | Glugla ............... F02D 17/02 |

* cited by examiner

Primary Examiner — Erick Solis
Assistant Examiner — Anthony L Bacon
(74) Attorney, Agent, or Firm — Taft Stettinius & Hollister LLP

(57) ABSTRACT

Systems, apparatus, and methods are disclosed that include an internal combustion engine having a plurality of cylinders operable by a valve actuation mechanism. Staging of engine operating conditions is disclosed to facilitate exit from and/or entrance into a cylinder deactivation event.

11 Claims, 7 Drawing Sheets

CYLINDER DEACTIVATION ENTRANCE AND EXIT CONTROL

FIELD OF INVENTION

This invention relates to an internal combustion engine including multiple cylinders, and more particularly to controlling entrance and/or exit operating conditions associated with a cylinder deactivation event of one or more of the multiple cylinders.

BACKGROUND

The cylinders in an internal combustion engine can be disabled in order to reduce fuel consumption. This may be accomplished by cutting off the supply of fuel to selected cylinders, particularly to save fuel under light engine load conditions. This increases the load on the other cylinders and provides some pumping loss reduction, but still requires pumping work to move the air flow through all the cylinders. Another method of cylinder disablement includes disabling or maintaining the intake and exhaust valves of the cylinder in a closed condition, which further reduces pumping work over simply providing a fuel cutoff to the deactivated cylinders.

Exiting and/or entering a cylinder deactivation event in which the intake and exhaust valves are closed can create operating inefficiencies and lags in responsiveness of the engine. Therefore, further improvements in cylinder deactivation systems and techniques are needed.

SUMMARY

Embodiments include unique systems and methods that include a multi-cylinder internal combustion engine configured to control deactivation of at least one cylinder of the multiple cylinders. In one embodiment, the engine includes a valve actuation mechanism connected to the cylinder(s) and a fuel supply system for supplying fuel to each cylinder. A controller is configured to receive one or more inputs associated with one or more operating conditions (such as vehicle speed and/or acceleration) and/or one or more route conditions of the vehicle to control exit from and/or entrance into a cylinder deactivation event in which the one or more cylinders are deactivated.

This summary is provided to introduce a selection of concepts that are further described below in the illustrative embodiments. This summary is not intended to identify key or essential features of the claimed subject matter, nor is it intended to be used as an aid in limiting the scope of the claimed subject matter. Further embodiments, forms, objects, features, advantages, aspects, and benefits shall become apparent from the following description and drawings.

DESCRIPTION OF ILLUSTRATIVE EMBODIMENTS

Figure 1:
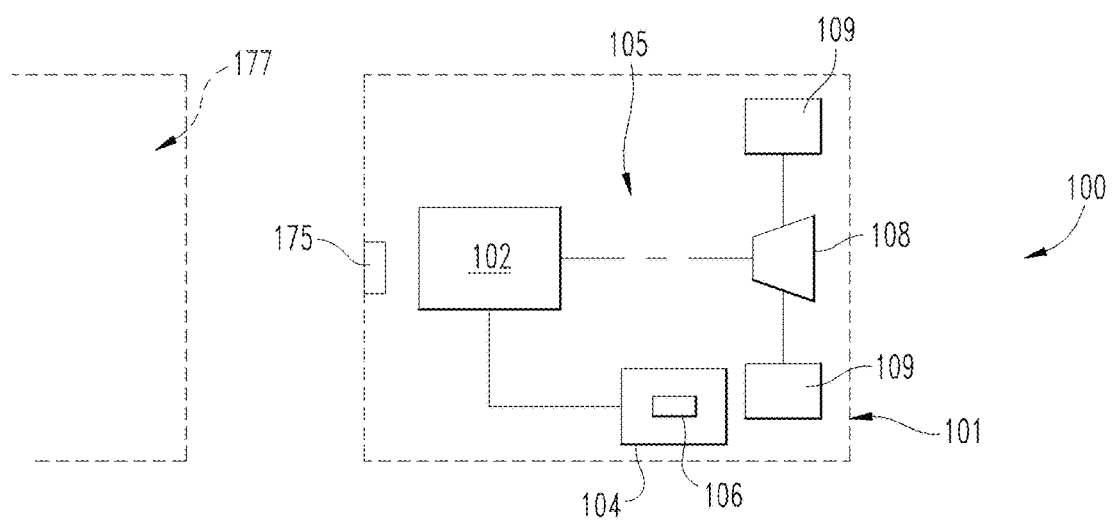
FIG. 1 is a schematic depiction of a vehicle system including a powertrain.

For the purposes of promoting an understanding of the principles of the invention, reference will now be made to the embodiments illustrated in the drawings and specific language will be used to describe the same. It will nevertheless be understood that no limitation of the scope of the invention is thereby intended, any alterations and further modifications in the illustrated embodiments, and any further applications of the principles of the invention as illustrated therein as would normally occur to one skilled in the art to which the invention relates are contemplated herein.

Referring to FIG. 1, a vehicle system 100 includes an engine 102 fluidly coupled to an aftertreatment system 104 as shown in FIG. 1. The vehicle system 100 further includes a transmission 108 coupled to the engine 102, comprising a portion of a powertrain 105 for propelling vehicle 101 via wheels 109. The engine 102 may be any type of internal combustion engine, including at least a diesel, gasoline, or natural gas engine, and/or combinations thereof. The aftertreatment system 104 may include any type of aftertreatment components 106 known in the art, which may include catalytic and/or filtration components. Example aftertreatment components 106 may include, without limitation, oxidation catalysts (e.g., a diesel oxidation catalyst ("DOC"), $NO_x$ treatment components (e.g., three-way catalyst, lean NOx catalyst, selective catalytic reduction ("SCR") catalyst, etc.), a filtration component (either catalyzed or uncatalyzed, e.g., a diesel particulate filter ("DPF"), and a cleanup catalyst (e.g., an ammonia oxidation catalyst).

In certain embodiments, the engine 102 includes a lean combustion engine such as a lean burn gasoline engine, or a diesel cycle engine. In certain embodiments, the engine 102 may be any engine type producing emissions that may include an exhaust gas recirculation (EGR) system, for example to reduce $NO_x$ emissions from the engine 102. In the illustrated embodiment of FIG. 2, the vehicle system 100 includes an engine 102 having an in-line 4 cylinder arrangement for illustration purposes. However, V-shaped arrangements and other any number of cylinders with V-shaped and with in-line arrangements are also contemplated.

The engine 102 includes a number of cylinders 103a, 103b (collectively referred to as cylinders 103.) The engine 102 includes nominal cylinders 103a which are operated with a nominal valve lift profile under both nominal operating events and cylinder deactivation events, and one or more deactivation cylinders 103b which are operated with a deactivated lift profile in response to a cylinder deactivation event being present. The deactivation cylinders 103b can be operated with the nominal valve lift profile when cylinder deactivation event conditions are not present. In the illustrated embodiment of FIG. 2, two cylinders of engine 102 are deactivation cylinders 103b, but more or fewer than two cylinders can be deactivation cylinders, including all cylinders 103. In addition, the cylinders identified as nominal cylinders 103a and deactivation cylinders 103b in FIG. 2 can be in any order. Furthermore, any known type of mechanism for deactivating one or more cylinders 103 is contemplated.

Figure 3:
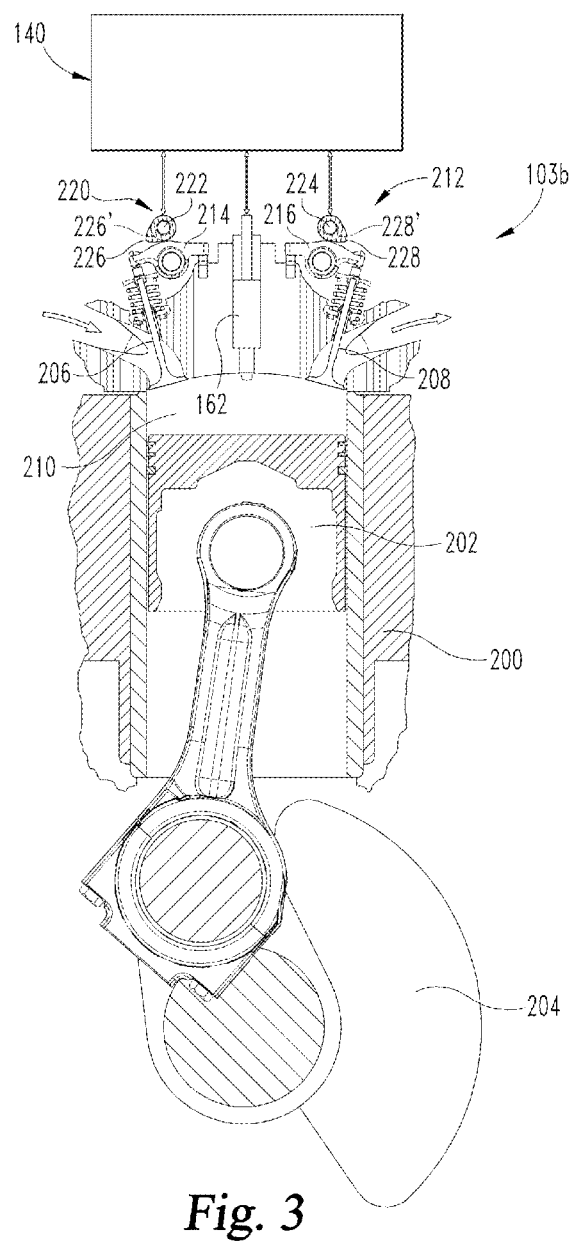
FIG. 3 is a schematic cross-section of a deactivation cylinder and valve actuation mechanism.

A typical multi-cylinder engine 102 has an engine block 200 with multiple cylinders 103, and, as shown in FIG. 3, a piston 202 in each cylinder that is operably attached to a crankshaft 204. There is also at least one intake valve 206 and at least one exhaust valve 208 that allow passage of air into and out of each cylinder 103. A combustion chamber 210 is formed inside each cylinder. The typical engine 102 operates on a four-stroke cycle that sequentially includes an air intake stroke, a compression stroke, a power stroke, and an exhaust stroke. As used herein, one cycle of the cylinder or engine occurs at the completion of these four strokes.

When cylinders are deactivated, the valve opening devices of the valve actuation mechanism 220 can be collapsed so the intake and exhaust valves of the deactivated cylinder(s) 103b remain in a completely closed condition during a cylinder deactivation event. In addition, fuel delivery to the deactivated cylinder(s) 103b is stopped. The active cylinders 103a can then be operated with a greater amount of air and fuel to meet the engine power demands. The active cylinders 103a thus operate with a greater air flow, reducing pumping losses, and improved fuel efficiency. However, the transition from a nominal lift profile for deactivation cylinders 103b into a deactivated lift profile for the cylinder deactivation event, and the transition from a cylinder deactivation event lift profile to a nominal lift profile for the deactivation cylinders 103b, can result in inefficiencies and reduced responsiveness of engine 102.

The present vehicle system 100 includes a valve actuation mechanism 220 that is configured and/or controlled to improve performance at the transitions out of and into and cylinder deactivation event valve lift profile for deactivation cylinders 103b. For example, in one embodiment, valve actuation mechanism 220 provides a first non-zero lift profile for opening and closing intake valve 206 of each cylinder 103 in response to nominal engine operating conditions. The exhaust valve(s) of each cylinder can also be opened and closed with a non-zero valve lift profile that is the same or different from that of the non-zero-valve lift profile that opens and closes the intake valves 206. Valve actuation mechanism 220 is further configured to be switched to a deactivated valve lift profile for operation of intake valves 206 and/or exhaust valves 208 of deactivation cylinders 103b in response to a cylinder deactivation event where cylinders 103b are deactivated.

The entrance into or exit from a cylinder deactivation event can be determined in response to one or more engine and/or vehicle operating conditions, such as a low engine load and/or low engine speed in one embodiment. In another embodiment, an increase in speed or acceleration of the vehicle determines whether to exit or enter a cylinder deactivation event, such as when the vehicle is motoring or coasting. The term "motoring" or "motored", as used hereinafter, describes an operating condition in which the engine 102 is not presently injecting fuel, and has zero torque requirement, but is turning because the engine 102 is connected to the transmission 108, which is turning due to rotation of the wheels 109 connected thereto.

In one embodiment, valve actuation mechanism 220 includes hardware mounted in a head 212 of engine 102 and control algorithms that are internal to the controller 140. The cylinder deactivation hardware includes a valve opening mechanism 214, 216 for respective ones of intake and exhaust valves 206, 208 of each cylinder 103. The valve actuation mechanism 220 also comprises a hydraulic subsystem (not shown) that supplies pressurized oil from an engine oil pump (not shown) to each valve opening mechanism 214, 216. In one embodiment, the valve opening mechanism 214, 216 is comprised of a lifter and a locking pin mechanism that is inserted between the camshaft 222, 224 and the respective valves 206, 208.

A typical valve train is comprised of the camshafts 222, 224, or in another embodiment a single cam shaft. The plurality of valves 206, 208 are normally closed to a zero lift position against their respective valve seats and are spring-mounted in the head 212. The valve train is operable to open the plurality of exhaust valves 208, the plurality of intake valves 206, or both, depending upon the engine design. Each camshaft 222, 224 is a long rod that is mounted in the engine 102 and rotates around its longitudinal axis. Each camshaft 222, 224 has cam lobes 226, 228, respectively, that correspond to and operate each valve 206, 208. Cam lobes 226, 228 are typically cut into the respective camshaft 222, 224 such that they are eccentric to the axis of rotation of the respective camshaft 222, 224.

Each lobe 226, 228 has an eccentric portion and a portion that is concentric to the longitudinal axis of the cam shaft. The concentric portion is defined by and can be referred to as the cam base circle, and the eccentric portion projects from the base circle to define a non-zero-lift profile to open and close the respective valve 206, 208 for a specified lift and duration from its valve seat. For example, the intake valve cam lobe 226 can define a non-zero lift profile 300 as shown in FIG. 3. Each lobe 226, 228 is in physical contact with a respective one of the valve opening mechanisms 214, 216, which are each comprised of a lifter and a locking pin mechanism. The valve opening mechanisms 214, 216 are in physical contact with a respective one of the valves 206, 208. The rotation of the camshaft 222, 224 causes respective valve 206, 208 to open according to the non-zero lift profile defined by the corresponding lobe 226, 228 when the position of the respective camshaft 222, 224 is such that the eccentric portion of its corresponding lobe 226, 228 is in contact with the adjacent valve opening mechanism 214, 216.

Figure 2:
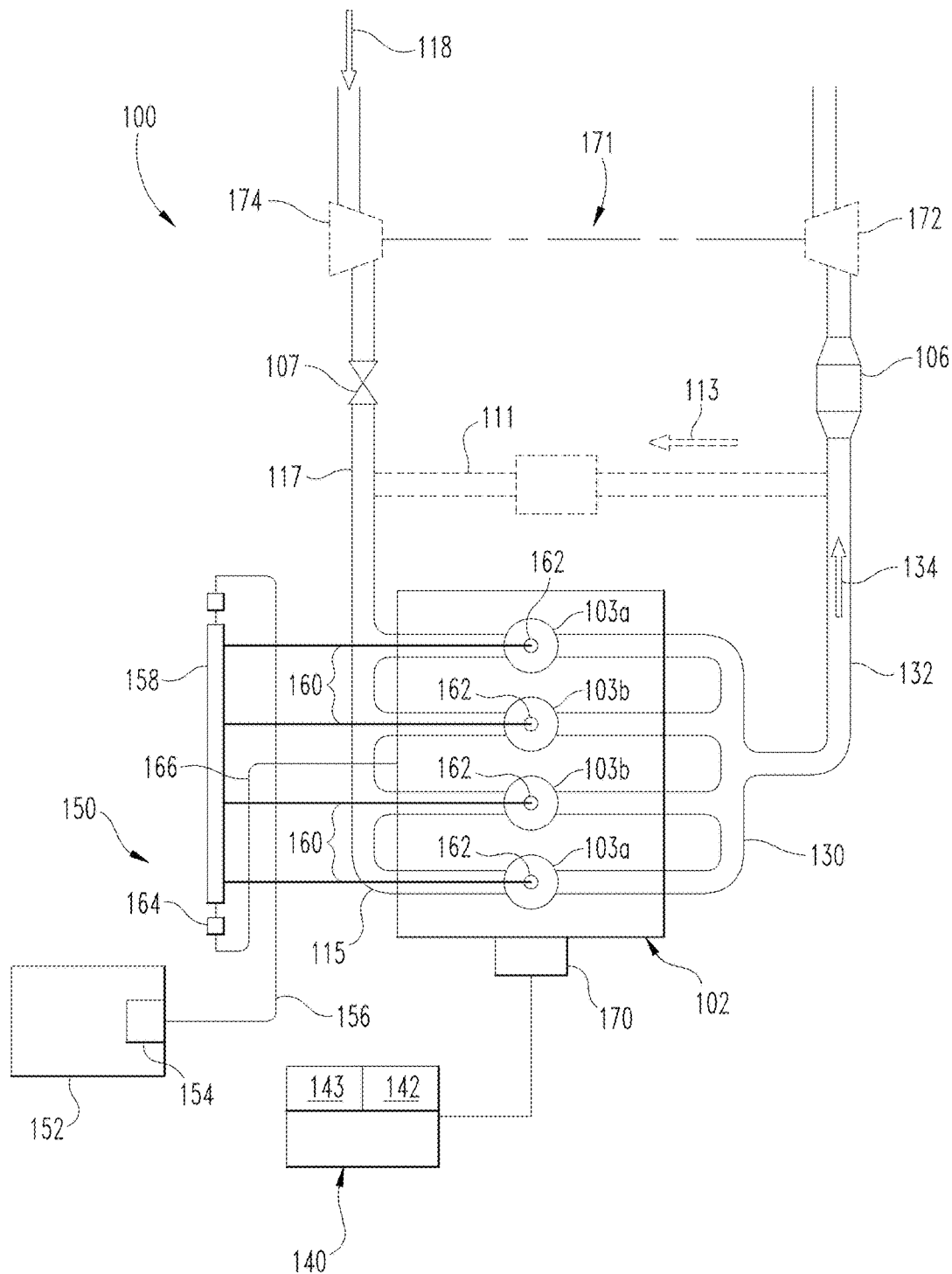
FIG. 2 is a schematic depiction one embodiment of a part the vehicle system of FIG. 1.

For deactivation cylinders 103b, such as shown in FIG. 2, the valve actuation mechanism 220 is operable to substantially or completely disable each intake valve 206, substantially or completely disable each exhaust valve 208, and substantially or completely disable each fuel injector 162 for each cylinder 103b that is to be deactivated in response to a cylinder deactivation condition. In one embodiment, the valve actuation mechanism 220 disables half of the cylinders 103 when in the deactivation mode. In a specific embodiment, camshaft 222 is switchable to place a second cam lobe 226' to operate the intake valves 206 of each of the deactivation cylinders 103b with a deactivated lift profile defined by second cam lobe 226' for intake valve 206 of the deactivation cylinder(s) 103b during cylinder deactivation conditions. Camshaft 224 associated with the exhaust valves 208 is also switchable from a third non-zero lift profile defined by a third cam lobe 228 to a fourth profile at a fourth cam lobe 228' that defines a deactivated lift profile that maintains the respective exhaust valve 208 at each deactivation cylinder 103b in a closed position. The deactivated lift profiles of cam lobes 226', 228' can be zero lift profiles so that the respective valve(s) remains in a closed position against its valve seat in response to cylinder deactivation events. Other embodiments contemplate lift profiles that are non-zero but effectively provide cylinder deactivation. In still other embodiments, any suitable valve actuation mechanism 220 for deactivating one or more cylinders 103 is contemplated, and it should be understood the present disclosure is not limited to the specifically disclosed embodiment unless noted otherwise.

Referring back to FIG. 2, in the vehicle system 100 exhaust flow 134 produced by cylinders 103 is provided to an exhaust manifold 130 and outlet to an exhaust passage 132. Vehicle system 100 may include an exhaust gas recirculation (EGR) passage 111 to provide an EGR flow 113 that combines with an intake flow 118 at a position upstream of an intake manifold 115. Intake manifold 115 provides a charge flow including the intake flow 118 and, if provided, with EGR flow 108 to cylinders 103. Intake manifold 115 is connected to an intake passage 117 that includes an intake throttle 107 to regulate the charge flow to cylinders 103. Intake passage 117 may also include a charge air cooler (not shown) to cool the charge flow provided to intake manifold 115. Intake passage 117 may also include an optional compressor 170 to compress the intake air flow received from an intake air cleaner (not shown.)

The EGR flow 113 may combine with the intake flow 118 at an outlet of EGR passage 111, at a mixer, or by any other arrangement. In certain embodiments, the EGR flow 113 returns to the intake manifold 115 directly. In the illustrated embodiment, EGR flow 113 mixes with the intake flow 118 downstream of throttle 107 so that exhaust pressure on cylinders 103 is closely aligned with intake pressure, which reduces pumping losses through cylinders 103. In other embodiments, EGR passage 111 can include an EGR cooler (not shown) and a bypass (not shown) with a valve that selectively allows EGR flow to bypass the EGR cooler. The presence of an EGR cooler and/or an EGR cooler bypass is optional and non-limiting.

Cylinders 103 are connected to an exhaust system that includes an exhaust manifold 130 that receives exhaust gases in the form of exhaust flow 134 from cylinders 103 and an exhaust passage 132 that receives exhaust gas from exhaust manifold 130. In other embodiments, a turbocharger 171 includes a turbine 172 in exhaust passage 132 is provided that is operable via the exhaust gases to drive a compressor 174 in intake passage 117. Turbine 172 may include a bypass (not shown) or a size-controllable inlet such as is provided with a variable geometry turbine (VGT) to control the exhaust flow therethrough and thus the speed of turbine 172. Exhaust passage 132 includes one or more aftertreatment components 106 in exhaust passage 132 configured to treat emissions in the exhaust gas. Other embodiments contemplate an exhaust throttle (not shown) in the exhaust passage 132.

Vehicle system 100 further includes a fuel system 150 that is operable to provide fuel from a fuel storage source 152, such as a fuel tank, to cylinders 103. In the illustrated embodiment, the fuel storage source 152 includes, for example, an onboard fuel pump 154 which delivers fuel from the source 152 via a conduit 156 through a filter (not shown) to a common supply rail 158. The common rail 158 feeds fuel via respective fuel lines 160 to a plurality of fuel injectors 162, at least one per cylinder, and in this example, four injectors 162. The common rail 158 can also be connected via conduit 156 to a pressure regulator valve 164 which in turn is connected to conduit 166 to vent fuel vapor to the intake passage 117 when the pressure in the rail 158 exceeds a predetermined maximum pressure. The fuel pump 154 is operated through a relay or other suitable connection to controller 140. It should be understood, however, that any suitable fuel system is contemplated.

A direct injector, as utilized herein, includes any fuel injection device that injects fuel directly into the cylinder volume, and is capable of delivering fuel into the cylinder volume when the intake valve(s) and exhaust valve(s) are closed. The direct injector 162 may be structured to inject fuel at the top of the cylinder 103. In certain embodiments, the direct injector 162 may be structured to inject fuel into a combustion pre-chamber. Each cylinder 103 may include one or more direct injectors 162. The direct injectors 162 may be the primary or the only fueling device for the cylinders 103, or alternatively the direct injectors may be an auxiliary or secondary fueling device for the cylinders 103. In certain embodiments, the direct injectors 162 are capable of providing the entire designed fueling amount for the cylinders 103 at any operating condition. Alternatively, the direct injectors 162 may be only partially capable, for example the direct injectors 162 may be capable of providing a designated amount of fuel for a specific purpose.

In still other embodiments, cylinders 103 include a port injector (not shown) in addition to or alternatively to direct injectors 162. In these embodiments, the intake manifold 115 may be divided, or the port fuel injectors may be positioned such that no other cylinder 103 in the vehicle system 100 is downstream of the port fuel injector, i.e. only the target cylinder is downstream of the respective port fuel injector.

The fuel supply to the combustion chamber of each cylinder is controlled by a fuel control module 142 that is a separate controller or a part of controller 140. Fuel control module 142 operates the injectors 162 according to a fuel command produced by controller 140 in response to engine operating conditions. The controller 140 is connected to the fuel pump 154 and to a plurality of other sensors shown schematically as sensor 170. The sensors 170 may include, but are not limited to, sensors which monitor or measure vehicle speed, vehicle acceleration, engine position, engine speed, manifold static pressure, mass air flow into the manifold, engine temperature, air temperature, cam shaft position (inlet and exhaust), inlet manifold tuning valves, barometric pressure, EGR amount, VGT position, torque demand, gear position, etc. In addition, controller 140 may be configured to receive from, for example, one or more sensors 170 or from a memory 143 of controller 140, a proximity or position of other vehicles, a spacing or distance to one or more other vehicles, a speed of one or more other vehicles, route conditions, upcoming grade conditions, GPS data, mapping data, inputs from one or more other vehicles or a forward looking radar system, and/or one or more models of vehicle system 100 including estimated mass, aerodynamic drag, and other conditions associated with vehicle 101.

In certain embodiments, the vehicle system 100 includes a controller 140 structured to perform certain operations to control operations of engine 102. In certain embodiments, the controller 140 forms a portion of a processing subsystem including one or more computing devices having memory, processing, and communication hardware. The controller 140 may be a single device or a distributed device, and the functions of the controller 140 may be performed by hardware or software. The controller 140 may be included within, partially included within, or completely separated from an engine controller (not shown). The controller 140 is in communication with any sensor or actuator throughout the vehicle system 100, including through direct communication, communication over a datalink, and/or through communication with other controllers or portions of the processing subsystem that provide sensor and/or actuator information to the controller 140.

In certain embodiments, the controller 140 is described as functionally executing certain operations. The descriptions herein including the controller operations emphasizes the structural independence of the controller, and illustrates one grouping of operations and responsibilities of the controller. Other groupings that execute similar overall operations are understood within the scope of the present application. Aspects of the controller may be implemented in hardware and/or by a computer executing instructions stored in non-transient memory on one or more computer readable media, and the controller may be distributed across various hardware or computer based components.

Example and non-limiting controller implementation elements include sensors providing any value determined herein, sensors providing any value that is a precursor to a value determined herein, datalink and/or network hardware including communication chips, oscillating crystals, communication links, cables, twisted pair wiring, coaxial wiring, shielded wiring, transmitters, receivers, and/or transceivers, logic circuits, hard-wired logic circuits, reconfigurable logic circuits in a particular non-transient state configured according to the module specification, any actuator including at least an electrical, hydraulic, or pneumatic actuator, a solenoid, an op-amp, analog control elements (springs, filters, integrators, adders, dividers, gain elements), and/or digital control elements.

The listing herein of specific implementation elements is not limiting, and any implementation element for any controller described herein that would be understood by one of skill in the art is contemplated herein. The controllers herein, once the operations are described, are capable of numerous hardware and/or computer based implementations, many of the specific implementations of which involve mechanical steps for one of skill in the art having the benefit of the disclosures herein and the understanding of the operations of the controllers provided by the present disclosure.

Certain operations described herein include operations to interpret or determine one or more parameters. Interpreting or determining, as utilized herein, includes receiving values by any method known in the art, including at least receiving values from a datalink or network communication, receiving an electronic signal (e.g. a voltage, frequency, current, or PWM signal) indicative of the value, receiving a software parameter indicative of the value, reading the value from a memory location on a non-transient computer readable storage medium, receiving the value as a run-time parameter by any means known in the art, and/or by receiving a value by which the interpreted parameter can be calculated, and/or by referencing a default value that is interpreted to be the parameter value.

Certain systems are described following, and include examples of controller operations in various contexts of the present disclosure. In certain embodiments, the controller 140 interprets a cylinder deactivation event in response to one or more vehicle operating and/or route conditions, and in response to entering the cylinder deactivation event the controller 140 provides a cylinder deactivation command that cuts fueling to one or more of deactivation cylinders 103b and then switches operation of their respective intake valves 206 and exhaust valves 208 to second cam lobe 226' and fourth cam lobe 228', respectively, each having a cylinder deactivation lift profile as discussed above. In certain other embodiments, the controller 140 interprets a cylinder deactivation event in response to one or more vehicle operating and/or route conditions, and in response to exiting the cylinder deactivation event the controller 140 provides a cylinder activation command that first switches operation of their respective intake valves 206 and exhaust valves 208 to first cam lobe 226 and third cam lobe 228 to open and close the intake and exhaust valves, and then provides fueling to the re-activated cylinders. In certain other embodiment, the speed of the turbocharger 171 is increased prior to fueling the re-activated cylinders.

The determination that conditions for entering and exiting a cylinder deactivation event includes determining or interpreting one or more vehicle operating conditions understood in the art indicating that cylinder deactivation produces favorable operating conditions, such as at low engine load conditions where the remaining non-deactivated cylinders 103a can satisfy the engine load requirements and fuel efficiency can be achieved by cutting fueling to one or more of the deactivation cylinders 103b. However, other conditions in which the cylinder deactivation event is present are also contemplated.

In certain other embodiments, the controller 140 interprets a motored mode along with a cylinder deactivation event in response to one or more vehicle operating conditions. In response to the motored mode being initiated fuel is cut-off to all cylinders 103 and in response to the cylinder deactivation event the controller 140 provides a cylinder deactivation command that switches operation of one or more deactivation cylinders 103b and their respective intake valves 206 and exhaust valves 208 to second cam lobe 226' and fourth cam lobe 228' each having a cylinder deactivation lift profile. The determination that conditions for entering and/or exiting a motored mode exist includes determining or interpreting one or more vehicle operating conditions understood in the art indicating that motoring produces favorable operating conditions, such as coasting in response to certain terrain and grade conditions where no fueling is needed to propel the vehicle. Deactivation of one or more of the cylinders 103 during the motored mode can produce further favorable operating conditions, such as temperature control of the aftertreatment system 104 during the motored mode by controlling the amount of air flow through engine 102.

The operation of the engine 102 is controlled by the controller 140 in response to vehicle operating conditions sensed by the sensors represented by sensor(s) 170. Controller 140 is connected to the fuel injectors 162, either indirectly as shown through fuel control module 142, or directly, to control the injector operation. The controller 140 can determine the injection timing and the injection period or pulse width. Under normal or nominal engine operating conditions, fuel is provided to all cylinders 103. Under a cylinder deactivation event, fuel in only provided to cylinders 103a and cut off from deactivation cylinders 103b. Under a motored mode, fueling is cut-off to all cylinders 103.

The fuel injectors 162 may inject the fuel supply directly into each respective cylinder 103 or may supply fuel to the inlet valve ports, the injection timing being controlled the controller 140. During a cylinder deactivation event the supply of fuel to the deactivation cylinders 103b is cut off by individually disabling the respective fuel injectors 162 with the disablement being controlled by the controller 140 with a fueling command which disables the fuel injection to one or more of the deactivation cylinders 103b while the nominal cylinders 103b fire normally, or are compensated with additional fuel and air flow to meet power demands. During a motored mode of operation the supply of fuel to all cylinders 103 is cut off by individually disabling the respective fuel injectors 162 with the disablement being controlled by the controller 140 with a fueling command.

Figure 4:
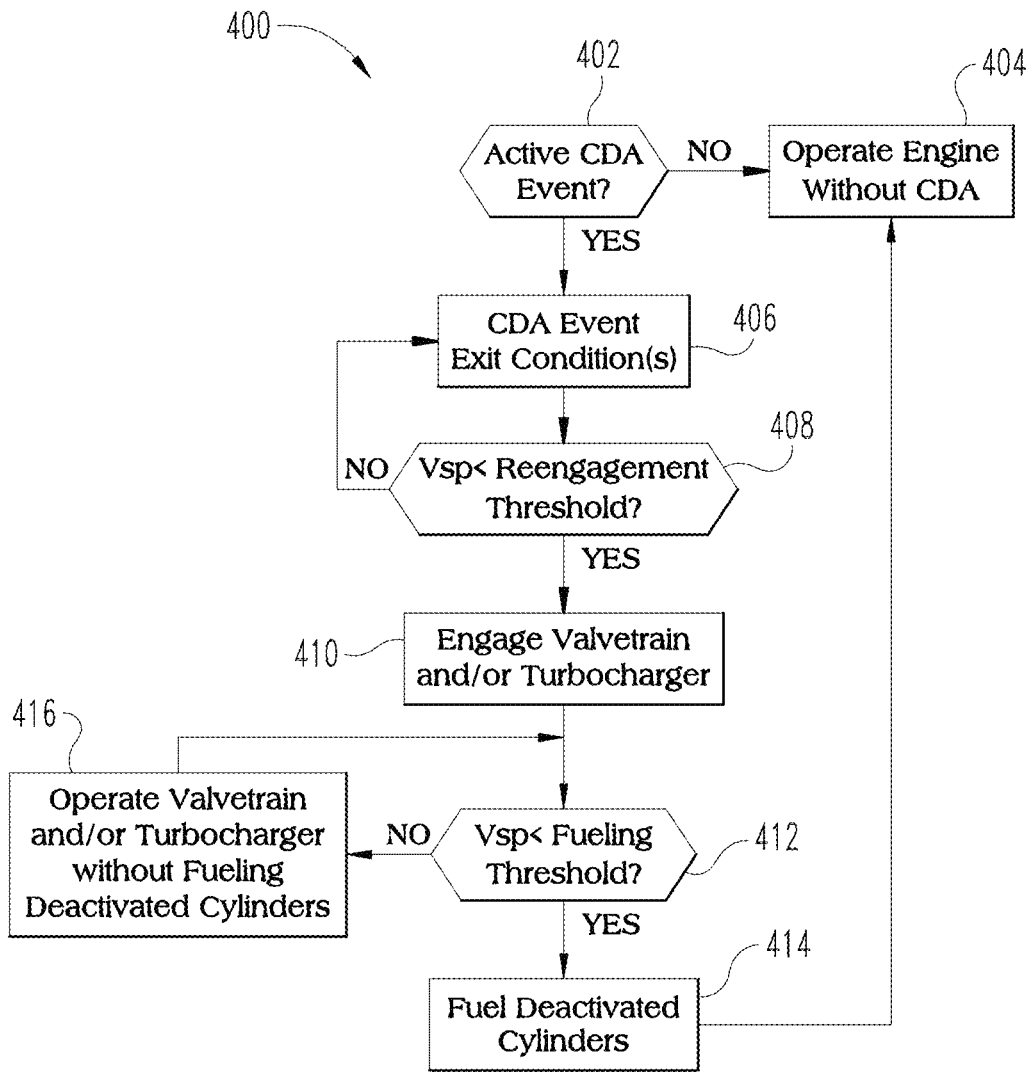
FIG. 4 is a flow diagram of a procedure for controlling one or more deactivated cylinders of an internal combustion engine.

Referring to FIG. 4, there is shown a flow diagram of a procedure 400 for exiting a cylinder deactivation (CDA) event of or more of the cylinders 103 of engine 102 in response to a speed of the vehicle 101. Procedure 400 begins at operation 402 in which it is determined whether a CDA event is active. If conditional 402 is negative procedure 400 continues at operation 404 to operate engine 102 without CDA. If conditional 402 is positive, procedure 400 continues at operation 406 to monitor for or determine the presence of one or more CDA event exit conditions.

Procedure 400 continues at conditional 408 to determine if the vehicle speed (Vsp) is less than a re-engagement threshold to stage the exit from the CDA event. If conditional 408 is negative, procedure 400 returns to operation 406 to monitor for CDA event exit condition(s). If conditional 408 is positive, procedure 400 continues at operation 410 to stage the exit from the CDA event by first engaging the valve train to activate the deactivated intake and exhaust valves 206, 208 and/or by engaging the turbocharger 171 of vehicle system 100. Engaging turbocharger 171 can include, for example, controlling a bypass and/or an inlet of turbine 172 to increase the turbocharger speed from a current turbocharger speed.

Procedure 400 continues from operation 410 at conditional 412 to determine if the Vsp is less than a fueling threshold. If conditional 412 is negative, procedure 400 continues at operation 416 to operate the valve train and/or turbocharger without fueling the one or more cylinders that were deactivated during the CDA event. The vehicle speed is further monitored to determine when Vsp is less than the fueling threshold. If conditional 412 is positive, procedure 400 continues at operation 414 to fuel the cylinder(s) that were deactivated during the CDA event, and the engine is operated without a CDA event being present. The staging of the re-engagement of the valve train and/or turbocharger provides a more efficient and responsive transition to non-CDA operations at operation 404.

Figure 5:
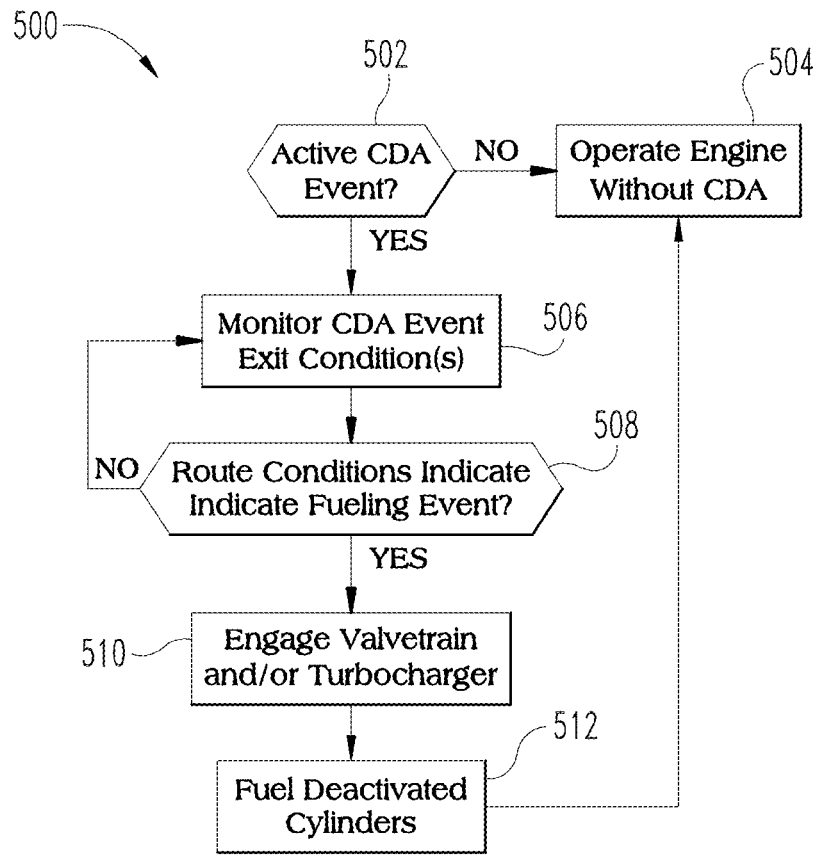
FIG. 5 is a flow diagram of another embodiment procedure for controlling one or more deactivated cylinders of an internal combustion engine.

Referring to FIG. 5, there is shown another embodiment procedure 500. Procedure 500 involves exiting a CDA event of one or more of the cylinders 103 of engine 102 in response to one or more route conditions of vehicle 101. Procedure 500 begins at conditional 502 in which it is determined whether a CDA event is active. If conditional 502 is negative procedure 500 continues at operation 504 to operate engine 102 without CDA being active. If conditional 502 is positive, procedure 500 continues at operation 506 to monitor for or determine one or more CDA event exit conditions.

Procedure 500 continues at conditional 508 to determine if one or more route conditions indicate that a fueling event for the deactivated cylinder(s) is needed. The route conditions can include, for example, look-ahead grade profile data such as from a stored map and GPS data that can be employed with a vehicle model to predict a timing for the fueling requirement to be initiated. Another example route condition includes radar data from a radar 175 (FIG. 1) indicating a spacing or distance between the vehicle and a second, target vehicle 177. Still other route conditions include data, such as from vehicle-to-vehicle communications, indicating positioning and/or speed or adjacent vehicles 177 relative to vehicle 101 to project the need to initiate fueling. If conditional 508 is negative, procedure 500 returns to operation 506 to continue to monitor for or determine CDA event exit condition(s).

If conditional 508 is positive, procedure 500 continues at operation 510 to stage the exit from the CDA event by engaging the valve train to activate the deactivated intake and exhaust valves 206, 208 of the deactivated cylinder(s) and/or by engaging the turbine 172 of turbocharger 171 of vehicle system 100 to increase its speed before fueling. Procedure 500 continues at operation 512 after engaging the valve train and/or turbocharger to fuel the deactivated cylinders to exit the CDA event. The staging of the re-engagement of the valve train and/or turbocharger provides a more efficient and responsive transition to non-motored and non-CDA engine operations at operation 504.

Figure 6:
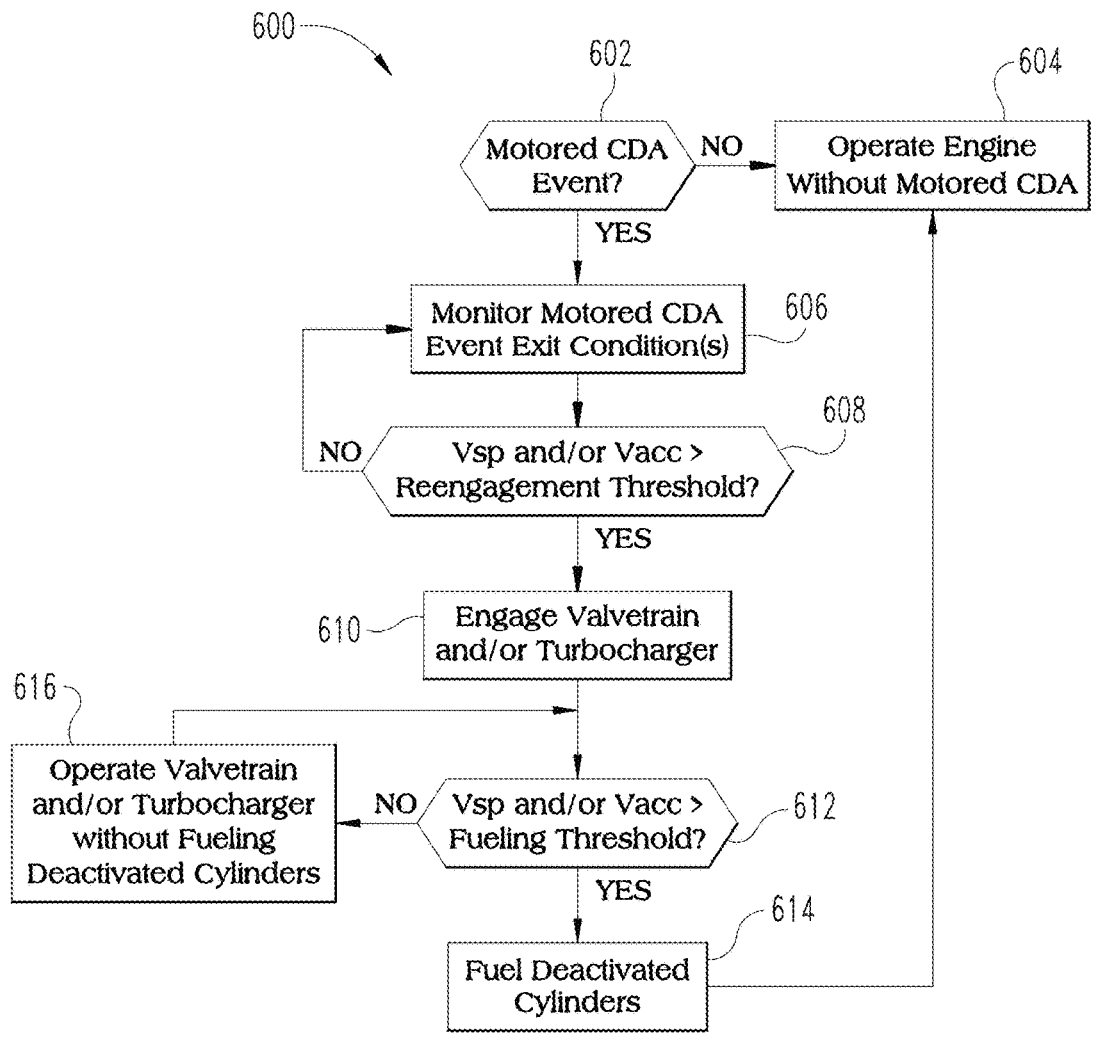
FIG. 6 is a flow diagram of another embodiment procedure for controlling one or more deactivated cylinders of an internal combustion engine.

Referring to FIG. 6, there is shown a flow diagram of a procedure 600 for exiting a motored mode of operation during the CDA event in which fueling of all cylinders 103 is cut off and the valve train of one or more deactivation cylinders 103b is disengaged. The procedure 600 exits the motored CDA event in response to a speed and/or acceleration of the vehicle 101. Procedure 600 begins at operation 602 in which it is determined whether a motored CDA event is active. If conditional 602 is negative procedure 600 continues at operation 604 to operate engine 102 without a motored CDA event. If conditional 602 is positive, procedure 600 continues at operation 606 to monitor for one or more motored CDA event exit conditions.

Procedure 600 continues at conditional 608 to determine if the Vsp and/or vehicle acceleration (Vacc) is less than a re-engagement threshold. If conditional 608 is negative, procedure 600 returns to operation 606 to monitor for motored CDA event exit condition(s). If conditional 608 is positive, procedure 600 continues at operation 610 to stage the exit from the motored CDA event by engaging the valve train to activate the deactivated intake and exhaust valves 206, 208 of the deactivated cylinders 103b and/or by engaging the turbine 172 of turbocharger 171 of vehicle system 100 to increase turbocharger speed, as discussed above.

Procedure 600 continues at conditional 612 to determine if Vsp and/or Vacc is less than a fueling threshold. If conditional 612 is negative, procedure 600 continues at operation 616 to operate the valve train and/or turbocharger without fueling the cylinders 103b that were deactivated during the motored CDA event. Vsp and Vacc is further monitored at operation 610 to determine if Vsp and/or Vacc is less than the fueling threshold. If conditional 612 is positive, procedure 600 continues at operation 614 to fuel all the cylinders 103 that were cut off from fueling during the motored CDA event. The staging of the re-engagement of the valve train and/or turbocharger before establishing fueling provides a more efficient and responsive transition to non-motored CDA operations at operation 604.

Figure 7:
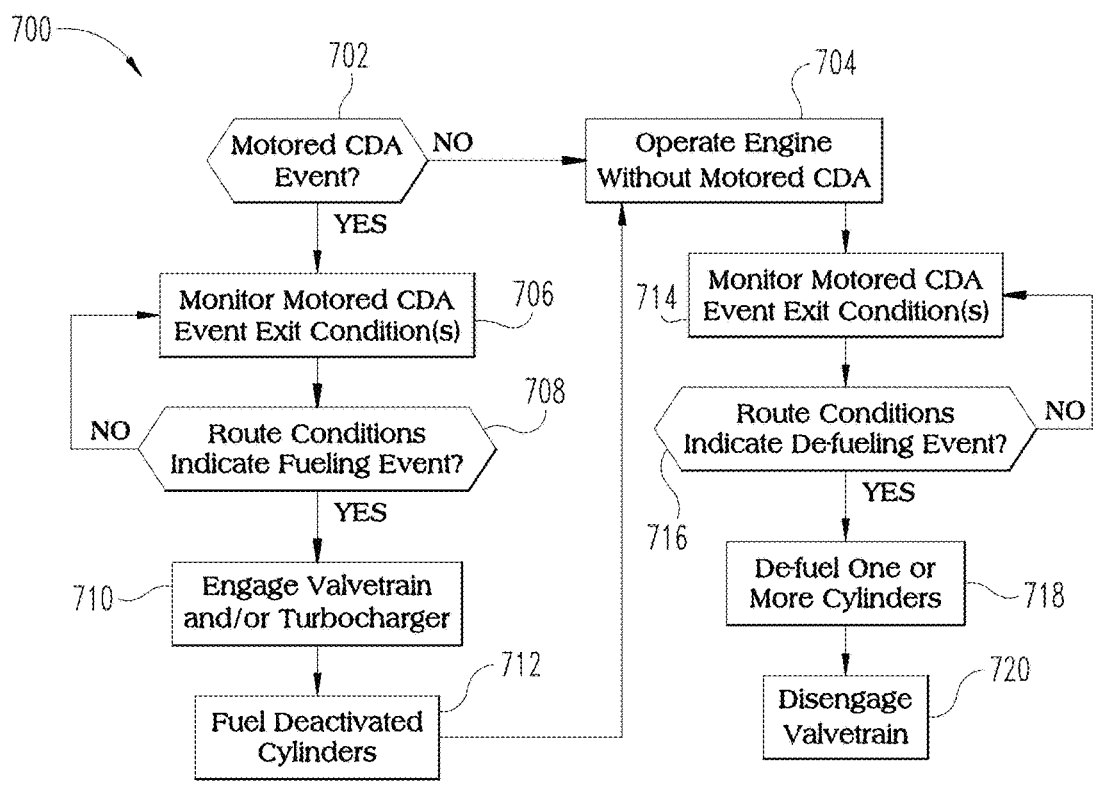
FIG. 7 is a flow diagram of another embodiment procedure for controlling one or more deactivated cylinders of an internal combustion engine.

Referring to FIG. 7, there is shown another embodiment procedure 700. Procedure 700 involves entering and exiting a motored CDA event of or more of the cylinders 103 of engine 102 in response to one or more route conditions of vehicle 101. Procedure 700 begins at conditional 702 in which it is determined whether a motored CDA event is active. If conditional 702 is negative, procedure 700 continues at operation 704 to operate engine 102 without CDA. If conditional 702 is positive, procedure 700 continues at operation 706 to monitor for one or more motored CDA event exit conditions.

Procedure 700 continues from operation 706 at conditional 708 to determine if one or more route conditions indicate that a fueling event or requirement for the deactivated cylinders is needed. For example, the route conditions can include, for example, look-ahead grade profile data such as from a stored map and GPS data that can be employed with a vehicle model stored in controller 140 to predict a timing of the fueling requirement. Another example of route conditions include radar data indicating a spacing or distance between the vehicle 101 and a second, target vehicle 177. Still other route conditions include data, such as from vehicle-to-vehicle communications, indicating positioning and/or speed of adjacent vehicles relative to vehicle 101 to project the need and timing to initiate fueling. For example, in one embodiment, the fueling requirement timing is determined based on the proximity/speed of other vehicles and the speed, estimated mass, aerodynamic drag, and upcoming grade of vehicle 101.

If conditional 708 is negative, procedure 700 returns to operation 706 to monitor for motored CDA event exit condition(s). If conditional 708 is positive, procedure 700 continues at operation 710 to stage the exit from the motored CDA event by engaging the valve train to activate the deactivated intake and exhaust valves 206, 208 and/or by engaging the turbocharger 171 of vehicle system 100. Procedure 700 continues at operation 712 after engaging the valve train and/or turbocharger to fuel all cylinders 103 to exit the motored CDA event. The staging of the re-engagement of the valve train and/or turbine provides a more efficient and responsive transition to non-motored and non-CDA operations at operation 704.

Procedure 700 further includes an operation 714 that continues from operation 704 to monitor vehicle 101 for motored CDA event entrance conditions. Conditional 716 evaluates route conditions to determine whether a de-fueling or fuel cut off event for all cylinders 103 is indicated. If conditional 716 is negative, procedure 700 returns to operation 714 to monitor for motored CDA event entrance conditions. If conditional 716 is positive, procedure 700 continues at operation 718 to stage the entrance to the motored CDA event by de-fueling the cylinders 103. After the fuel is cut-off, one or more cylinders 103 are deactivated after the fuel is cut off from the cylinders 103 by disengaging the valve train for the deactivated cylinders 103b.

Various aspects of the present disclosure are contemplated. {Insert claims here after approval}

While the invention has been illustrated and described in detail in the drawings and foregoing description, the same is to be considered as illustrative and not restrictive in character, it being understood that only certain exemplary embodiments have been shown and described. Those skilled in the art will appreciate that many modifications are possible in the example embodiments without materially departing from this invention. Accordingly, all such modifications are intended to be included within the scope of this disclosure as defined in the following claims.

In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A system comprising:
   an internal combustion engine for propelling a vehicle, the internal combustion engine including a plurality of cylinders, each of the cylinders including at least one intake valve and at least one exhaust valve;
   a valve actuation mechanism connected to each of the plurality of cylinders, the valve actuation mechanism including a lifting mechanism for opening and closing the at least one intake valve and the at least one exhaust valve;
   a fueling system connected to each of the plurality of cylinders for providing fuel to the plurality of cylinders;
   a controller operably connected with the valve actuation mechanism and the fueling system, wherein the controller is configured to:
      determine an active cylinder deactivation event associated with the at least one cylinder in which the valve actuation mechanism is deactivated and the fueling is cut off from the at least one cylinder;
      in response to the active cylinder deactivation event being present, determine at least one of a speed of the vehicle and an acceleration of the vehicle; and
      in response to the at least one of the speed and the acceleration crossing a first threshold, activating the valve actuation mechanism to open and close the at least one intake valve and the at least one exhaust valve of the at least one cylinder, and in response to the at least one of the speed and the acceleration crossing a second threshold after crossing the first threshold, fueling the at least one cylinder with the fueling system.

2. The system of claim 1, wherein, before fueling the at least one cylinder, the controller is further configured to increase a speed of a turbocharger connected to the internal combustion engine in response to the at least one of the speed and the acceleration crossing the first threshold.

3. The system of claim 1, wherein the cylinder deactivation event includes remaining ones of the plurality of cylinders receiving fueling and the valve actuation mechanism opening and closing the at least one intake and exhaust valves of the remaining ones of the plurality of cylinders.

4. The system of claim 3, wherein the controller is configured to determine the speed of the vehicle and the first threshold is greater than the second threshold.

5. The system of claim 1, wherein the cylinder deactivation event includes a motored mode of operation of the internal combustion engine in which fueling is cut off to all the plurality of cylinders and a portion of the plurality of cylinders have the valve actuation mechanism deactivated.

6. The system of claim 5, wherein the first threshold is less than the second threshold.

7. A method for operating a vehicle, comprising:
   determining a cylinder deactivation event associated with at least one cylinder of an internal combustion engine is present during which a valve actuation mechanism operably connected to the at least one cylinder is deactivated and fueling to the at least one cylinder is cut off;
   in response to the cylinder deactivation event being present, determining at least one of a speed of the vehicle and an acceleration of the vehicle;
   in response to the at least one of the speed and acceleration crossing a first threshold, activating the valve actuation mechanism to open and close at least one intake valve and at least one exhaust valve of the at least one cylinder; and
   in response to the at least one of the speed and acceleration crossing a second threshold after crossing the first threshold, fueling the at least one cylinder.

8. The method of claim 7, further comprising increasing a speed of a turbocharger in the exhaust system in response to the at least one of the speed and acceleration crossing the first threshold and before the at least one of the speed and the acceleration crosses the second threshold.

9. The method of claim 7, wherein the cylinder deactivation event includes remaining ones of the plurality of cylinders receiving fueling and the valve actuation mechanism opening and closing the at least one intake and exhaust valves of the remaining ones of the plurality of cylinders, and further comprising determining the speed of the vehicle and the first threshold is greater than the second threshold.

10. The method of claim 7, wherein the internal combustion engine operates in a motored mode of operation during the cylinder deactivation event and the first threshold is less than the second threshold, wherein fueling is cut off to all cylinders of the internal combustion engine in the motored mode.

11. The method of claim 10, wherein the internal combustion engine includes a plurality of cylinders and in the motored mode of operation a remaining portion of the plurality of cylinders include intake and exhaust valves that are opened and closed by the valve actuation mechanism.

* * * * *